United States Patent
Anderson et al.

(12) 
(10) Patent No.: US 6,471,937 B1
(45) Date of Patent: Oct. 29, 2002

(54) HOT GAS REACTOR AND PROCESS FOR USING SAME

(75) Inventors: John Erling Anderson, Somers, NY (US); Arthur Wellington Francis, Jr., Monroe, NY (US); Matthew Lincoln Wagner, White Plains, NY (US); Christopher Brian Leger, Houston, TX (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/148,779

(22) Filed: Sep. 4, 1998

(51) Int. Cl.[7] .................. C01B 31/18; C01B 31/00; C01G 23/047; G10J 1/00
(52) U.S. Cl. ................ 423/659; 423/418.2; 423/449.1; 423/613; 48/197 R
(58) Field of Search ................ 422/194, 220; 431/374.13; 423/213.2, 613, 592, 659, 1, 449.1, 418.2; 48/197 R

(56) References Cited

U.S. PATENT DOCUMENTS

| | | | | |
|---|---|---|---|---|
| 2,071,119 A | * | 2/1937 | Harger | 423/213.2 |
| 2,559,638 A | | 7/1951 | Krchma et al. | 23/202 |
| 2,934,410 A | | 4/1960 | Smith | 23/277 |
| 2,946,651 A | * | 7/1960 | Houdry | 423/213.2 |
| 3,045,422 A | * | 7/1962 | Houdry | 423/213.2 |
| 3,066,477 A | * | 12/1962 | Houdry | 423/213.2 |
| 3,172,729 A | | 3/1965 | DeGalocsy et al. | 23/209.4 |
| 3,403,001 A | | 9/1968 | Mas et al. | 23/202 |
| 3,607,119 A | * | 9/1971 | Nesbitt | 422/176 |
| 3,701,823 A | * | 10/1972 | Hardison | 423/213.2 |
| 3,735,000 A | * | 5/1973 | Calcagno et al. | 423/613 |
| 3,914,390 A | * | 10/1975 | Kudo et al. | 723/213.2 |
| 4,865,820 A | * | 9/1989 | Dunsten et al. | 422/226 |
| 5,106,590 A | | 4/1992 | Hopper et al. | 422/198 |
| 5,110,563 A | * | 5/1992 | Noakes et al. | 422/194 |
| 5,169,620 A | * | 12/1992 | Rudy et al. | 422/220 |
| 5,204,071 A | * | 4/1993 | Carter et al. | 422/194 |
| 5,266,024 A | | 11/1993 | Anderson | 431/11 |
| 5,538,706 A | | 7/1996 | Kapoor et al. | 423/418.2 |
| 5,883,138 A | * | 3/1999 | Hershkowitz et al. | 518/703 |
| 5,886,056 A | | 3/1999 | Hershkowitz et al. | 518/703 |

FOREIGN PATENT DOCUMENTS

| | | |
|---|---|---|
| EP | 0001946 | 10/1978 |
| GB | 911421 | 2/1961 |
| GB | 1276788 | 4/1970 |
| JP | 10272352 | 10/1998 |

* cited by examiner

*Primary Examiner*—Steven Bos
(74) *Attorney, Agent, or Firm*—Robert J. Follett

(57) ABSTRACT

The invention comprises a reactor having a source of a first hot reactant gas, a mixing chamber in which said first hot reactant gas mixes with a second reactant gas to form a reactant gas mixture, but wherein substantially no reaction takes place and a reaction zone wherein said mixture undergoes vapor phase reaction. A process for using the reactor is also disclosed.

20 Claims, 3 Drawing Sheets

Restriction through which reactant A is injected into mixing chamber as an expanding jet.

HOT GAS REACTOR AND PROCESS FOR USING SAME

FIELD OF THE INVENTION

The invention relates to the field of vapor phase chemical reactions. More particularly, the invention relates to a particular reactor design and reaction process for such reactions.

BACKGROUND OF THE INVENTION

Many commodity chemicals, such as ethylene oxide, acrylonitrile, hydrogen cyanide, and titanium dioxide are produced via vapor phase reactions. The economics of these processes are largely determined by the reactant selectivity (the moles of product formed divided by the moles of reactant which undergo reaction), reactant conversion (the moles of reactant that react divided by the mole of reactant entering the reactor), and the capital cost of the reactor.

Conventional vapor phase reactors are designed and operated in a manner to maximize selectivity and conversion within a narrow window of operational parameters. Chief among these operational parameters are reactant concentrations, pressure, temperature, and velocity, with limits on these parameters set primarily by reactant or product flammability and capital cost restrictions. In particular, reactant feed concentrations must often be kept below the lower flammability limit and the resulting oxygen to hydrocarbon ratio controls oxidation selectivity and conversion.

In cases where pure oxygen alone is used at the optimum oxygen to hydrocarbon ratio, the oxygen-feed mixture is near stoichiometric, and therefore quite flammable. Thus, an added ballast gas such as methane, $CO_2$ or steam is necessary as a diluent. The addition of a separate diluent gas is not necessary in air-based processes, as the nitrogen in air acts as the diluent. Unfortunately however, the use of either air or diluted oxygen results in decreased reaction efficiencies and increased reactor size.

At present there are three broad categories of commercial reactor designs that are based on how the reactants are contacted. These categories are pre-mixed, in-situ mixed, and indirectly contacted.

Pre-mixed reactors include fixed catalytic bed, catalytic gauze bed, and catalytic monolith. In pre-mixed systems, the reactants are separately conveyed to a device which mixes the two streams. The residence time within this mixing zone is typically on the order of seconds. The reaction mixture can be preheated by providing thermal energy to the mixture or to either one or both of the reactants prior to interacting. The uniform mixture flows to a reaction zone where the reaction is initiated. In most cases, the reaction zone contains a heterogeneous catalyst. The residence time within the reaction zone is on the order of one second for fixed bed reactors and 0.01 seconds for gauze bed and monolith reactors. In a few cases, the reaction is performed homogeneously without the aid of a catalyst. In these cases, the reaction zone may contain an ignition source or some flame stabilization mechanism, and the residence time in the reaction zone is on the order of 0.1 seconds.

The most common catalytic pre-mixed reactor is a fixed bed reactor. In this type of reactor, a solid catalyst is packed within long tubes which are placed within a circulating heat transfer fluid which is used to remove the heat of reaction. Products such as phthalic anhydride, maleic anhydride, acrylic acid, ethylene oxide, and vinyl acetate are made using these reactors.

Another commercialized catalytic pre-mixed reactor is a gauze reactor. In these reactors, the catalyst is a very thin (on the order of a centimeter) bundle of wire mesh through which the reaction mixture flows. No attempt is made to remove the heat of reaction from the catalyst bed. Hydrogen cyanide and nitric oxide are made using this type of reactor.

A catalytic monolith reactor is a solid porous structure through which gas can flow. Catalytic monoliths have been used commercially to perform total oxidation reactions in catalytic combustion and in automotive catalytic converters. Typically with these reactors, no attempt is made to remove the heat of reaction within the reactor itself. Additionally, this type of reactor has been employed at bench scale to perform partial oxidation reactions.

In-situ mixed reactors include fluid catalytic bed and homogeneous burner reactors. In in-situ mixed systems, the reactants are brought together for the first time within the reactor. The major commercial in-situ mixed reactor is a fluid bed reactor. In fluid bed reactors, the reactants are injected separately into a vessel which contains a large mass of circulating solid particles. The reactant gases cause the motion of the solid particles. Typically, these particles act as catalysts. These reactors are typically equipped with internal steam coils to remove the heat of reaction within the reactor. The residence time in these reactors are typically on the order of 10 seconds. Examples of products produced in fluid beds include acrylonitrile and maleic anhydride.

Occasionally non-catalytic homogeneous reactions are also conducted in in-situ mixed systems, as disclosed in U.S. Pat. No. 2,559,638, 2,934,410, 3,172,729, 3,403,001. In these reactors, the reactants are separately conveyed to a single zone where they undergo simultaneous mixing and reaction.

The third class of reactors are indirectly contacted reactors, such as a catalytic transport bed reactor. With indirect contact reactors, the reactants are never actually brought together. Instead, the oxygen source and reactant are isolated from each other in the reactor either spatially or temporally. The only known commercial reactor of this type is the transport bed. In this type of reactor, the solid catalyst is conveyed between two different isolated sections of the reactor. One reactant is injected into one section while the second reactant is injected into the other. A version of such a reactor has recently been commercialized for the production of maleic anhydride.

While other vapor phase reactor designs have been proposed, there still remains a need in the art to develop a safe, low capital cost reactor with the potential of achieving uniquely high selectivities and high conversions for vapor phase reactions.

OBJECTS OF THE INVENTION

It is therefore an object of the invention to provide a vapor phase reactor that ensures reactions having high selectivity and conversion.

It is a further object of the invention to provide such a reactor that is safe and has low capital and operation costs.

It is a further object of the invention to provide a process for using such a reactor.

SUMMARY OF THE INVENTION

A preferred embodiment of the invention comprises a reactor including a source of a first reactant gas that is at a temperature greater than 500° C., a mixing chamber or zone in which said first reactant gas mixes with a second reactant gas to form a substantially homogeneous reactant gas mixture, but wherein substantially no reaction takes place and a reaction chamber or zone wherein said mixture undergoes vapor phase reaction.

The invention also includes a chemical vapor reaction process. The steps of a preferred process include:

a) feeding a reactant gas or inert gas at a first pressure to a first chamber;

b) heating said reactant gas or inert gas;

c) passing said heated gas through one or more nozzles to a second chamber that is at lower pressure than said first chamber;

d) injecting a second reactant that is either in a gaseous or supercritical state into said second chamber;

e) maintaining said first reactant gas and said second reactant in said mixing chamber for a time sufficient to form a substantially uniform mixture of said first reactant gas and said second reactant but wherein substantially no reaction between said first reactant gas and said second reactant takes place;

f) injecting said substantially uniform mixture into a third chamber wherein reaction of said mixture occurs.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

Figure 1:
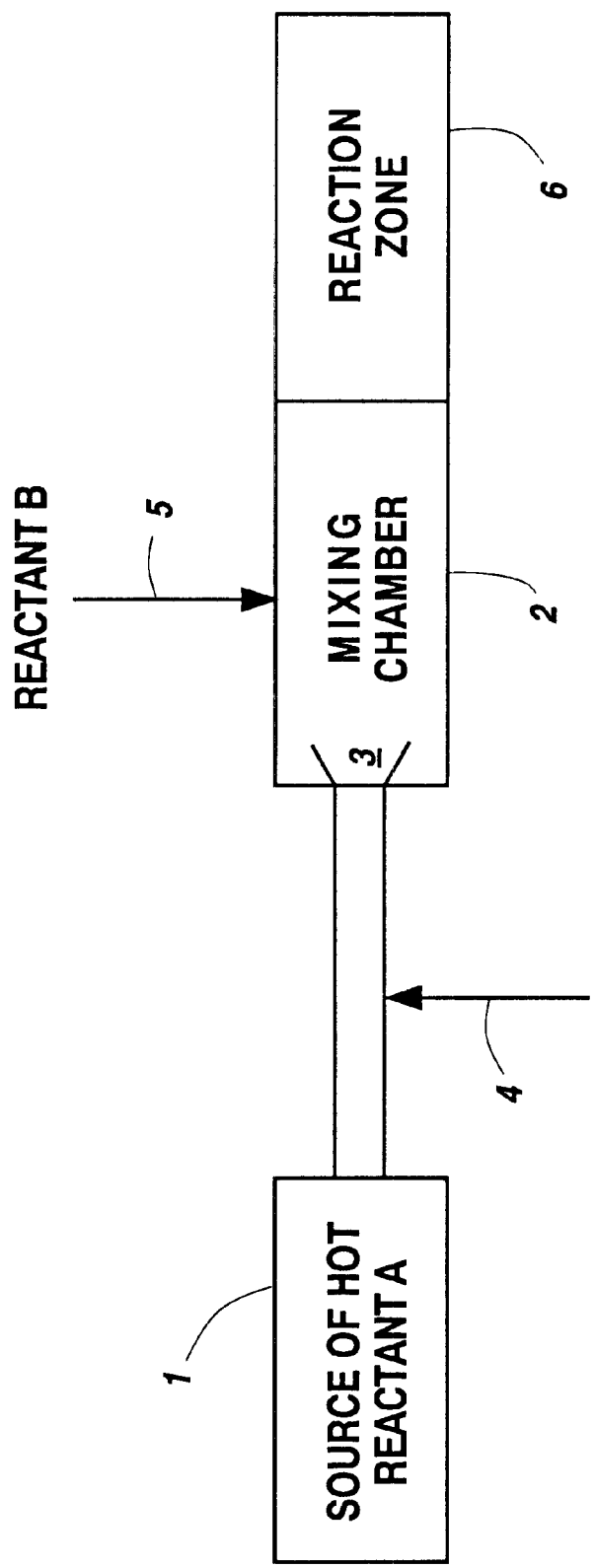
FIG. 1 is a schematic diagram of a reactor according to the invention.

The invention may be accomplished by a hot gas reactor ("HGR") having the general structure illustrated in FIG. 1. We should note that by the term "hot" we mean a gas at a temperature greater than about 500° C., preferably greater than about 530° C. A preferred range of temperatures is preferably about 500° C. to about 2800° C., and more preferably about 500° C. to about 1700° C.

The first component of the reactor is a source 1 of hot reactant gas (referred to as reactant A). Reactant A is preferably oxygen, but is not limited as such. A preferred source 1 is via the use of the thermal nozzle combustion method described in U.S. Pat. No. 5,266,024 to Anderson.

The reactor further comprises a mixing chamber 2 where reactant A and another reactant gas (referred to herein as Reactant B) undergo extremely rapid mixing, but experience substantially no reaction.

Reactant A is injected into the mixing chamber 2 as an expanding jet 3. Expanding jet 3 may be formed by placing a restriction 4 (such as a flow nozzle) between the hot gas source 1 and the mixing chamber 2.

The absolute pressure of the hot gas before it is injected into the mixing chamber is preferably at least 1.2 times, more preferably at least 1.5 times, and most preferably at least 2 times the absolute pressure in the mixing chamber.

The pressure in the mixing chamber should preferably range from 200 to 0.01 atmospheres (atm), more preferably 100 to 0.01 atm, and most preferably 10 to 1 atm. All pressures referred to herein are absolute pressures.

Running the HGR at the pressures described offers at least the following three advantages. The first is that there will be improvements in at least one of selectivity, conversion, productivity, and decreased byproduct formation. The second is that the reactor can be made smaller for the same mass flow rate, which will keep the mixing times small at very large flow rates and reduce the capital cost of the reactor. Third, high pressure operation of the HGR and subsequent discharge of the reaction products at high pressure may allow advantageous operation of unit operations downstream of the HGR. These unit operations include, but are not limited to, additional reaction, product separation, and product recovery.

Reactant B is injected into the mixing chamber adjacent to the where reactant A is injected by some suitable means 5 such as multiple injection ports preferably arranged perpendicular to the axis of the expanding jet of reactant A.

The velocity of reactant A should preferably be greater than about 60 meters/second (m/s), more preferably greater than about 150 m/s, and most preferably greater than about 300 m/s. A critical element of the invention is that the use of a hot reactant jet enables the reactants to mix extremely rapidly. The contact time of the reactants in the mixing zone should be short enough to prevent any significant reaction from occurring in the mixing section. The time required before significant reaction occurs depends on the particular reactants and reaction conditions. The contact time of reactant A and reactant B in the mixing chamber should preferably be less than about 10 milliseconds, more preferably less than about 1 millisecond, and most preferably less than about 0.5 milliseconds.

The mixture of reactant A and Reactant B undergoes a vapor phase reaction in reaction zone 6. The vapor phase reaction may be catalytic and/or non-catalytic. In the case of a catalytic reaction, the reaction zone is differentiated from the mixing zone by the presence of a catalyst such as a monolith, a packed bed, or a gauze pack. In the case of a homogeneous reaction, the reaction zone is differentiated from the mixing zones by the presence of a sharp chemical gradient or a flame stabilization device.

The use of a hot gas stream in the mixing step is critical to this invention. The heating of reactant A upstream of the mixing chamber 2 improves the mixing between the reactants in two respects. First, the velocity of the hot gas (Reactant A) entering the mixing chamber 2 increases as the with an increase in temperature of the hot gas. For example, if reactant A was oxygen provided at 21° C. and 1.8 atm and discharged at 1 atm, the exit velocity of the gas from the nozzle 4 would be 290 m/s. In comparison, if the oxygen were heated up to 1090° C., the exit velocity at the same supply pressure would be 625 m/s. Since the rate of gas mixing is a direct function of gas velocity, the advantage of heating reactant A is substantial.

Second, according to jet theory, amount of mixing between a gas jet (e.g. Reactant A) and an ambient gas (e.g. Reactant B) increases as the density of the jet gas decreases. Gas density is inversely proportional to the absolute temperature. Thus for a given initial jet diameter, the amount of entrainment (and thereby mixing) of reactant B into the jet over a given jet length would be doubled as the jet gas temperature increased from 21° C. to 904° C.

The invention differs from prior art reactors, such as pre-mixed non-catalytic reactors, in that the mixing in the mixing chamber 2 takes place under reactive conditions. The invention differs from prior art reactors, such as in situ-mixed non-catalytic reactors, in that a substantially homogeneous mixture of reactants is formed within the mixing chamber 2 before any substantial reaction occurs. The rapid rate of mixing allows for a substantially homogeneous mixture to be formed within the mixing chamber 2 prior to the initiation of substantial reaction even though the mixing occurs under reactive conditions.

In contrast to the presently described invention, in conventional pre-mixed reactor design, in order to avoid reaction and explosion upstream of the reaction section, it is usually necessary to reduce the preheat temperature and/or the concentration of the reactants to a relatively low level (e.g. on the order of 200° C. or less). As a result, the product yield and selectivity for the process are reduced.

Because of extremely rapid mixing in the HGR, the limitations on temperature, pressure, and reactant concentrations that have been placed on conventional reaction designs are unnecessary. A significantly expanded range of operating conditions can be safely used. Thus, the operating conditions can be set to obtain improved conversion and selectivity as compared to conventional reactors. The HGR allows for the mixing of reactants without the need for diluent (e.g. ballast gas).

The invention has been reduced to practice by reacting a hot oxygen stream with hydrocarbon in a small scale HGR. The hot oxygen stream was obtained by continuously burning a small amount fuel using a thermal nozzle as described in U.S. Pat. No. 5,266,024.

The laboratory mixing chamber design had four equally spaced feed gas inlets located near the hot oxygen entrance nozzle. The mixing chamber was tube approximately 2.54 cm long and 1.9 cm in diameter, and had no internal baffles. The reaction zone was the same diameter as the diameter of the mixing zone, thus allowing for very simple construction. This also allowed the reaction mixture stream to be delivered to the reaction zone with a nearly uniform velocity profile. The laboratory HGR employed heterogeneous catalysts in the reaction zone.

Figure 2:
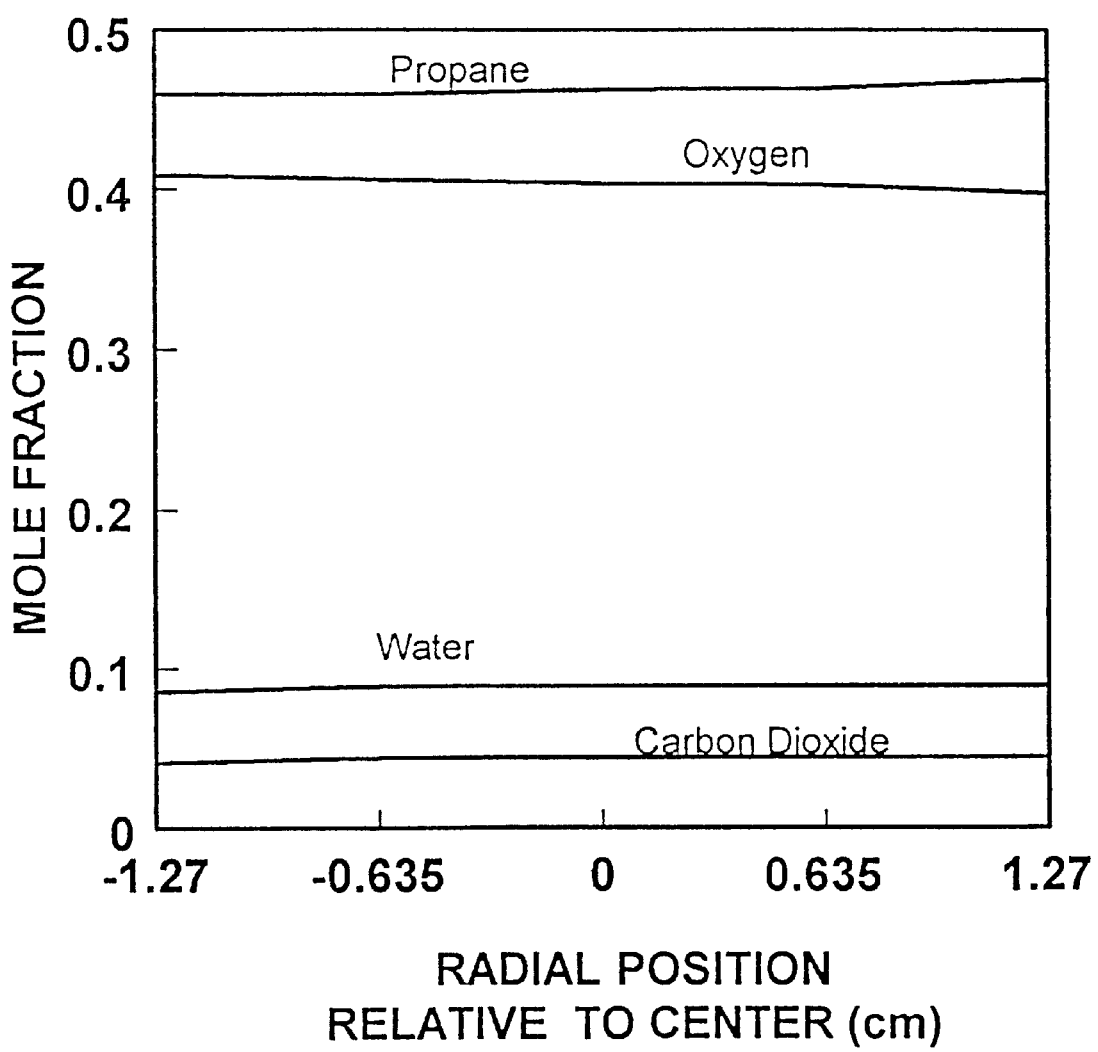
FIG. 2 is a graph of experimentally measured concentration profiles for oxygen, carbon dioxide water and propane at the exit of the mixing chamber of a reactor according to the invention.
Figure 3:
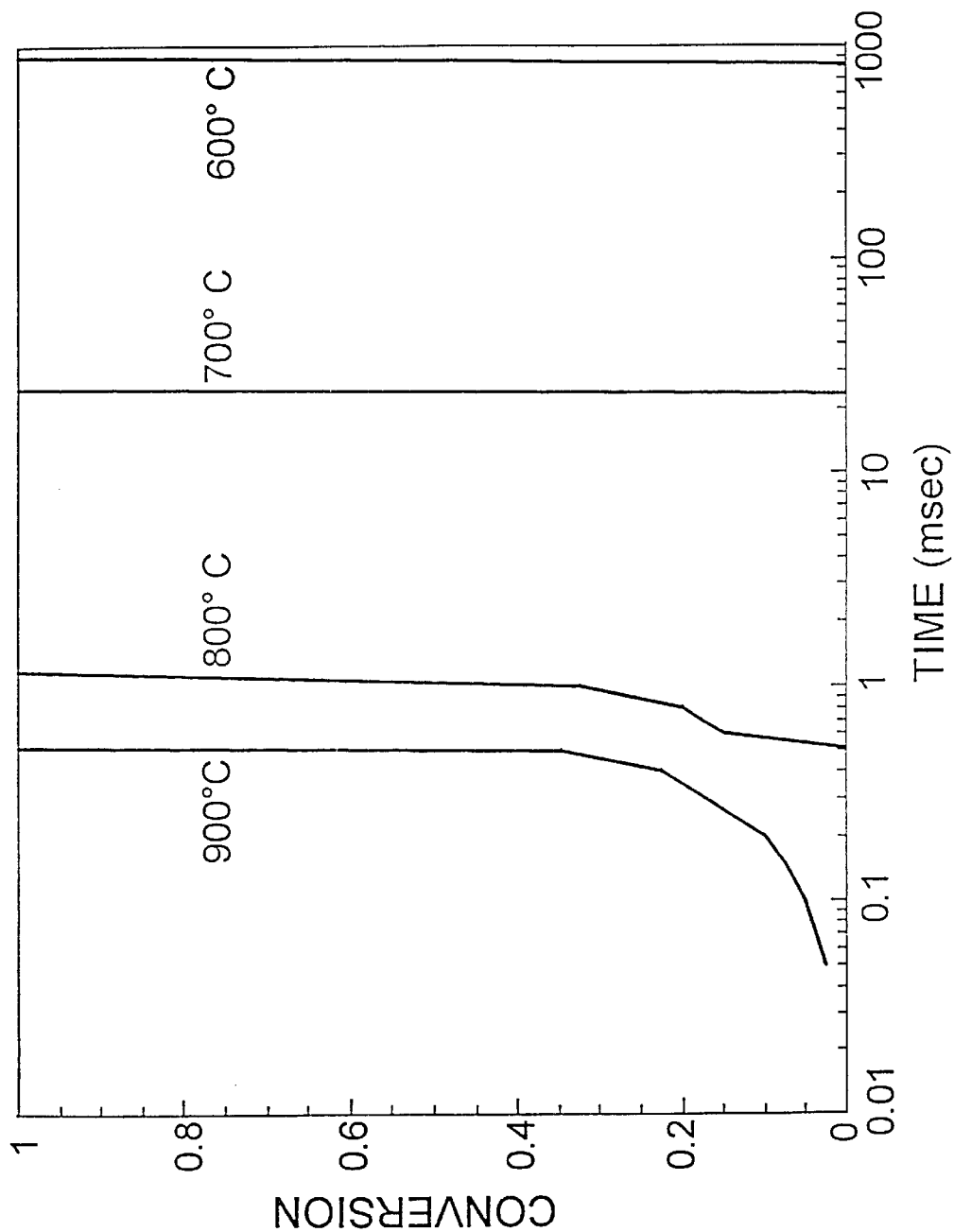
FIG. 3 is a graph of the time to initiate homogeneous gas phase reaction for several different reactant gas mixtures.

Data set forth in Table 1 below and in FIGS. 2 and 3, illustrates that in this small scale HGR the mixing of the reactants is very rapid and done without the occurrence of any homogeneous reaction.

Table 1 presents calculated results for the entrainment of methane into a hot oxygen jet for a 0.16 cm jet diameter and a 10:1 methane to oxygen ratio. The data shows that the expected mixing time achieved with the laboratory HGR is on the order of 0.4 msec or less.

| Temperature (° C.) | 27 | 1,650 | 1,650 |
| Velocity (m/s) | 300 | 300 | 760 |
| Jet Length (cm) | 3.5 | 1.4 | 1.4 |
| Mixing Time (msec) | 0.4 | 0.16 | 0.06 |

These calculations are based on the rate of entrainment equation developed by Ricou and Spalding, and reported in: M. A. Field et al, Combustion of Pulverized Coal, the British Utilization Research Association (1767)46.

FIG. 2 is an experimental gas concentration profile observed in the laboratory HGR at the end of the mixing chamber. In this example approximately 11 standard liters per minute (SLPM) of natural gas and approximately 137 SLPM of oxygen were routed to a thermal nozzle (see U.S. Pat. No. 5,266,024) where all the natural gas was completely combusted to produce a hot reactant oxygen stream containing approximately 115 SLPM of oxygen, 11 SLPM of carbon dioxide, and 22 SLPM of water vapor. This mixture served as the hot reactant A for the HGR. Approximately 90 SLPM of propane was routed to the mixing chamber to serve as reactant B.

FIG. 2 shows the concentrations of oxygen, carbon dioxide and water vapor as measured at the exit of the mixing chamber at five different points along the diameter of the mixing chamber. The calculated concentrations of propane as derived from a species balance are also shown in FIG. 2. No other chemical species were detected.

The concentrations of all the chemical species were uniform across the diameter of the exit of the mixing zone. Thus the results illustrated in FIG. 2 verify that by the end of the mixing chamber the two reactants (Reactant A: the hot oxygen gas from the thermal nozzle and Reactant B: the propane) were well mixed.

Additionally, the measured oxygen, carbon dioxide, and water vapor concentrations were that which would be expected assuming complete mixing of the hot oxygen gas and propane in the mixing zone without any accompanying reaction. Thus the results illustrated in FIG. 2 verifies that no appreciable reaction between the two reactants (Reactant A: hot oxygen gas from the thermal nozzle and Reactant B: propane) occurred within the mixing chamber.

FIG. 3 illustrates that under many conditions no appreciable homogeneous reaction occurs in the HGR mixing chamber. In FIG. 3, the "Thermochemistry Calculator" (available from the California Institute of Technology and based on CHEMKIN (a computer program developed by Sandia Livermore National Laboratory to calculate known homogeneous reaction kinetics) was used to calculate the fraction percent of propane reacted versus time for several different oxygen-propane mixtures.

The initial composition of each different reaction mixture was set at the stoichiometric ratio for the production of CO, e.g. 2:3 propane:oxygen. The initial temperature was calculated by assuming complete and instantaneous mixing between oxygen at the temperatures indicated in FIG. 3 and propane at 25° C. Typically, the residence time within the mixing zone will be less than 0.5 milliseconds (msec). Thus, the data presented in FIG. 3 demonstrates that at several temperatures the two reactants can be completely mixed and safely delivered to the reaction zone before homogeneous reaction is initiated.

Table 2 lists the operating limits for the vapor phase partial oxidation of butane to maleic anhydride (a process for which all three commercial catalytic reactor types have been used) for conventional reactor design and the HGR. Laboratory data for the oxidation of butane over a monolith reactor is also included. This table demonstrates the greater range of operating conditions achievable with the HGR as compared to conventional technology.

TABLE 2

Comparison of HGR with conventional heterogeneous reactor designs.

| Reactor Type | Feed Concentration | Oxidant | Temperature | Pressure | Gas Velocity |
|---|---|---|---|---|---|
| Fixed Bed | <2% | Air | 400° C. | 1.5 atm | <0.1 m/sec |
| Fluidized Bed | <4% | Air | 400° C. | 2.5 atm | <1 m/sec |
| Transport Bed | *1 | Air | 400° C. | 2.5 atm | 1.5–12 m/sec |
| Monolith | 8–15% | Air | 1000° C. | 1 atm | <0.5 m/sec |
| Hot Oxygen | 0–75% | Oxygen | 1000° C. | 1.5–15 atm | >400 m/sec |

[1]Separate hydrocarbon and oxygen entrances.

As is apparent from the above discussion, the HGR allows for the safe reaction of feed and reactant gas (e.g. oxygen) at concentrations, temperatures, and pressures that were previously unattainable due to flammability risk. In cases of oxidation, the HGR allows for the use of oxygen without a diluent, thus resulting in reducing the size and improving the efficiency of downstream recovery operations and in greatly reducing the volume of the process tailstream.

It should be noted that the actual mixing time in the HGR would be expected to be less that shown in Table 1 because reactant B is typically introduced as forced jets oriented perpendicular to the hot gas jet. Thus the momentum of reactant B is not negligible and can promote mixing.

In conventional homogeneous pre-mixed reactor designs, the reactants are pre-mixed under non-reactive conditions and then transported to a reaction zone where the conditions are such to initiate reaction. In order to insure that uncontrolled reaction does not occur within the mixing zone of these types of reactors, either very complicated mixing chamber designs must be employed or the feed concentrations, temperature, and pressure must be such that reaction cannot occur. Complicated mixing chamber designs are undesirable because of their high associated construction costs. Limiting the feed conditions is undesirable because this leads to lower selectivities and capacity. Additionally undesired reactions can occur as the reactant mix is raised to the reaction temperature.

The HGR avoids all of these problems. The mixing chamber is quite simple. The reactants can be safely mixed under a broader set of conditions, and reaction is suppressed until the reactants are well mixed and at the optimum reaction conditions.

In homogeneous in-situ mixed systems, the reactants are mixed directly in the reaction zone under reaction conditions. Thus reaction and mixing occur simultaneously. This means that the reaction time and reactant concentrations vary significantly with location. This makes the product yield, selectivities, and quality vary quite a bit. This variation is highly undesirable.

The HGR eliminates shortcomings associated with homogeneous in-situ mixed systems. By completely mixing the reactants before they undergo any reaction, the reaction time and reactant concentration are very well defined. Thus the reactor is operated under optimal conditions without experiencing variability in product yield, selectivity, and quality. Further, due to the fast mixing of reactants, flammability hazards are reduced.

As shown in FIG. 1, the design of the HGR is quite simple. This simplicity in design will make the engineering, construction, and maintenance of a commercial HGR reactor significantly less expensive than that of conventional reactors, both homogeneous and heterogeneous.

The HGR can be used for a variety of chemical reactions, including currently performed vapor phase reactions as well as reactions which are not currently performed commercially. Examples include, but are not limited to: dehydrogenation reactions, production of syn-gas, ammoxidations, ammonia oxidation, selective free-radical reactions, formation of carbon black and metal oxide particle production, and thermal cracking with atomic hydrogen.

The invention is not limited to oxygen and hydrocarbon reactants. Rather, the first hot gas may include inert gases (i.e. argon, helium, nitrogen, and carbon dioxide), or other gases such as hydrogen, carbon monoxide, chlorine, and fluorine or mixtures of any of the above gases. If the gas is argon, for example, the hot argon could serve to heat up the second reactant rapidly and provide a uniform, dilute reactant stream at the reaction zone.

Different methods of heating the first gas may be utilized. These would include combustion, electric arcs, and indirect heating such as resistance heating.

The second reactant may be a gas or supercritical fluid. It may also be a mixture of components and gaseous/supercritical phases. With respect to particular reactants the gas may be, but is not limited to, a gaseous hydrocarbon such as methane, ethane, propane, butane, isobutane, ethylene, and propylene, butylene, and isobutylene, a gaseous non-hydrocarbon such as ammonia or titanium tetrachloride, or a mixture of these gaseous components. The supercritical fluid may be, but is not limited to a pure hydrocarbon such as methane, ethane, propane, butane, isobutane, ethylene, propylene, butylene, and isobutylene; a pure non-hydrocarbon such as ammonia or titanium tetrachloride, or a mixture of components. Those skilled in the art will recognize that the operating parameters for gases discussed above will also be applicable for supercritical fluids, and will also recognize the conditions necessary to make a particular gas or mixture of gases become a supercritical fluid (e.g. butane is a supercritical fluid at a pressure greater than 36 atm, and a temperature greater than 153° C.) We should also note that the second reactant may include inert or non-reactive components (e.g. the reactant may comprise 50% nitrogen/50% hydrocarbon)

While the illustrated embodiment shows a single gas nozzle, two or more nozzles for the hot gas jets entering the mixing chamber are also contemplated. In addition, different mixing chamber designs are possible. For example, the following could be used: an expanding or contracting truncated cone, a cylinder with expansions or contraction at either or both ends, and a rectangular duct.

The invention is not limited to particular catalyst materials or arrangements. For example, different catalysts such as gauzes or packed beds could be used. The reaction zone could be non-catalytic as well.

The mixing zone and/or reaction zone can be cooled by an external means of cooling including, but not limited to a water jacket or water spraying. Further, injectors for specifically introducing reactant B to the mixing zone may be added to the HGR.

Specific features of the invention are shown in one or more of the drawings for convenience only, as such feature may be combined with other features in accordance with the invention. Alternative embodiments will be recognized by those skilled in the art and are intended to be included within the scope of the claims.

What is claimed is:

1. A method for producing chemical products by a vapor phase reaction comprising:
   a. expanding a first gas having a temperature of from about 500° C. to about 2800° C. and a velocity greater than about 300 m/sec through a nozzle into a mixing chamber;
   b. injecting a second gas having a lower temperature and lower velocity than the first gas in the mixing chamber so that the second gas is entrained with the first gas and rapidly mixed together to produce a substantially uniform mixture, but without substantial reaction taking place in the mixing chamber; and
   c. reacting the mixture in a reaction zone.

2. The method of claim 1 which further comprises introducing the first gas at an absolute pressure of at least 1.2 times the absolute pressure of the mixing chamber.

3. The method of claim 1 wherein the reaction zone comprises a catalyst.

4. The method of claim 1 which further comprises quenching the reaction to terminate the reaction.

5. The method of claim 1 which further comprises recycling the by-product from the reaction.

6. The method of claim 1 which comprises heating the second gas prior to entraining into the mixing chamber.

7. A method for producing chemical products by a vapor phase reaction comprising:
   a. expanding a first gas comprising an oxidant through a nozzle to produce a heated first gas of from about 500° C. to about 2800° C. at a high velocity of greater than about 300 m/sec into a mixing chamber;
   b. injecting a second gas comprising an oxidizable material having a lower temperature and lower velocity than the first gas in the mixing chamber so that the second gas is entrained with the first gas and rapidly mixed together to produce a substantially uniform mixture, but without substantial reaction taking place in the mixing chamber; and
   c. reacting the mixture in a reaction zone.

8. The method of claim 7 which further comprises introducing the heated first gas at an absolute pressure of at least 1.2 times the absolute pressure of the mixing chamber.

9. The method of claim 7 wherein the second gas comprises hydrocarbons and hydrogen.

10. The method of claim 7 wherein the reaction zone comprises a catalyst.

11. The method of claim 7 which further comprises quenching the reaction to terminate the reaction.

12. The method of claim 7 which further comprises recycling the by-product from the reaction.

13. The method of claim 7 which comprises heating the second gas prior to entraining into the mixing chamber.

14. A method for producing chemical products by a vapor phase reaction comprising:
   a. expanding a first gas comprising an oxidizable material through a nozzle to produce a heated first gas of from about 500° C. to about 2800° C. at velocity of greater than about 300 m/sec into a mixing chamber;
   b. injecting a second gas comprising an oxidant having a lower temperature and lower velocity than the first gas in the mixing chamber so that the second gas is entrained with the first gas and rapidly mixed together to produce a substantially uniform mixture, but without substantial reaction taking place in the mixing chamber; and
   c. reacting the mixture in a reaction zone.

15. The method of claim 14 which further comprises introducing the first gas at an absolute pressure of at least 1.2 times the absolute pressure of the mixing chamber.

16. The method of claim 14 wherein the first gas comprises hydrocarbons and hydrogen.

17. The method of claim 14 wherein the reaction zone comprises a catalyst.

18. The method of claim 14 which further comprises quenching the reaction to terminate the reaction.

19. The method of claim 14 which further comprises recycling the by-product from the reaction.

20. The method of claim 14 which comprises heating the second gas prior to entraining into the mixing chamber.

* * * * *